(12) United States Patent
Schaffner et al.

(10) Patent No.: US 8,376,666 B2
(45) Date of Patent: Feb. 19, 2013

(54) TOOL CONDITION MONITORING SYSTEM

(75) Inventors: Georges Schaffner, Hittnau (CH); Josef Stirnimann, Winterthur (CH); Andreas Kirchheim, Pfungen (CH); Drazen Veselovac, Aachen (DE); René Schmitz, Nickenich (DE)

(73) Assignee: Kistler Holding AG, Winterthur (CH)

( * ) Notice: Subject to any disclaimer, the term of this patent is extended or adjusted under 35 U.S.C. 154(b) by 1203 days.

(21) Appl. No.: 12/063,207

(22) PCT Filed: Aug. 30, 2006

(86) PCT No.: PCT/CH2006/000470
§ 371 (c)(1),
(2), (4) Date: Feb. 7, 2008

(87) PCT Pub. No.: WO2007/025404
PCT Pub. Date: Mar. 8, 2007

(65) Prior Publication Data
US 2010/0132528 A1    Jun. 3, 2010

(30) Foreign Application Priority Data
Aug. 31, 2005    (CH) .................................. 1430/05

(51) Int. Cl.
B23B 29/24    (2006.01)
(52) U.S. Cl. .............................. 408/9; 408/42
(58) Field of Classification Search ............. 408/8–11, 408/42; B32B 39/24
See application file for complete search history.

(56) References Cited

U.S. PATENT DOCUMENTS

| | | | | |
|---|---|---|---|---|
| 3,246,544 A * | 4/1966 | Cooper | | 408/3 |
| 3,571,834 A * | 3/1971 | Mathias | | 408/9 |
| 3,675,517 A * | 7/1972 | Tadayoshi | | 82/118 |
| 3,733,142 A * | 5/1973 | Hoglund | | 408/42 |
| 4,030,853 A * | 6/1977 | Mizen | | 408/10 |
| 4,153,382 A * | 5/1979 | Mueller | | 408/10 |
| 4,697,964 A * | 10/1987 | Daiko et al. | | 408/6 |
| 4,924,713 A | 5/1990 | Machino et al. | | |
| 6,550,118 B2 * | 4/2003 | Smith et al. | | 29/26 A |
| 6,786,683 B2 * | 9/2004 | Schaer et al. | | 408/16 |
| 6,958,588 B2 | 10/2005 | Engelfried | | |
| 8,079,130 B2 * | 12/2011 | Hardouin-Finez | | 29/525.06 |
| 2006/0120819 A1 * | 6/2006 | Honegger et al. | | 409/235 |

FOREIGN PATENT DOCUMENTS

| DE | 19632377 A1 | 2/1998 |
|---|---|---|
| JP | 62166913 A * | 7/1987 |

OTHER PUBLICATIONS

PCT/CH2006/000470—International Search Report Publication Date: Mar. 8, 2007.

* cited by examiner

Primary Examiner — Eric A Gates
(74) Attorney, Agent, or Firm — Dority & Manning, P.A.

(57) ABSTRACT

The invention relates to a tool having a tool element which rotates in operation with at least one geometrically defined blade, in particular a material cutting tool element. The tool element is subject to an operating parameter in the operating condition. A measuring device is provided for determination and conversion of the operation parameter into a measured signal. A first measuring device cooperates with a first tool element in the operating condition such that essentially only a first operating parameter for the first tool element may be recorded by the first measuring device.

19 Claims, 1 Drawing Sheet

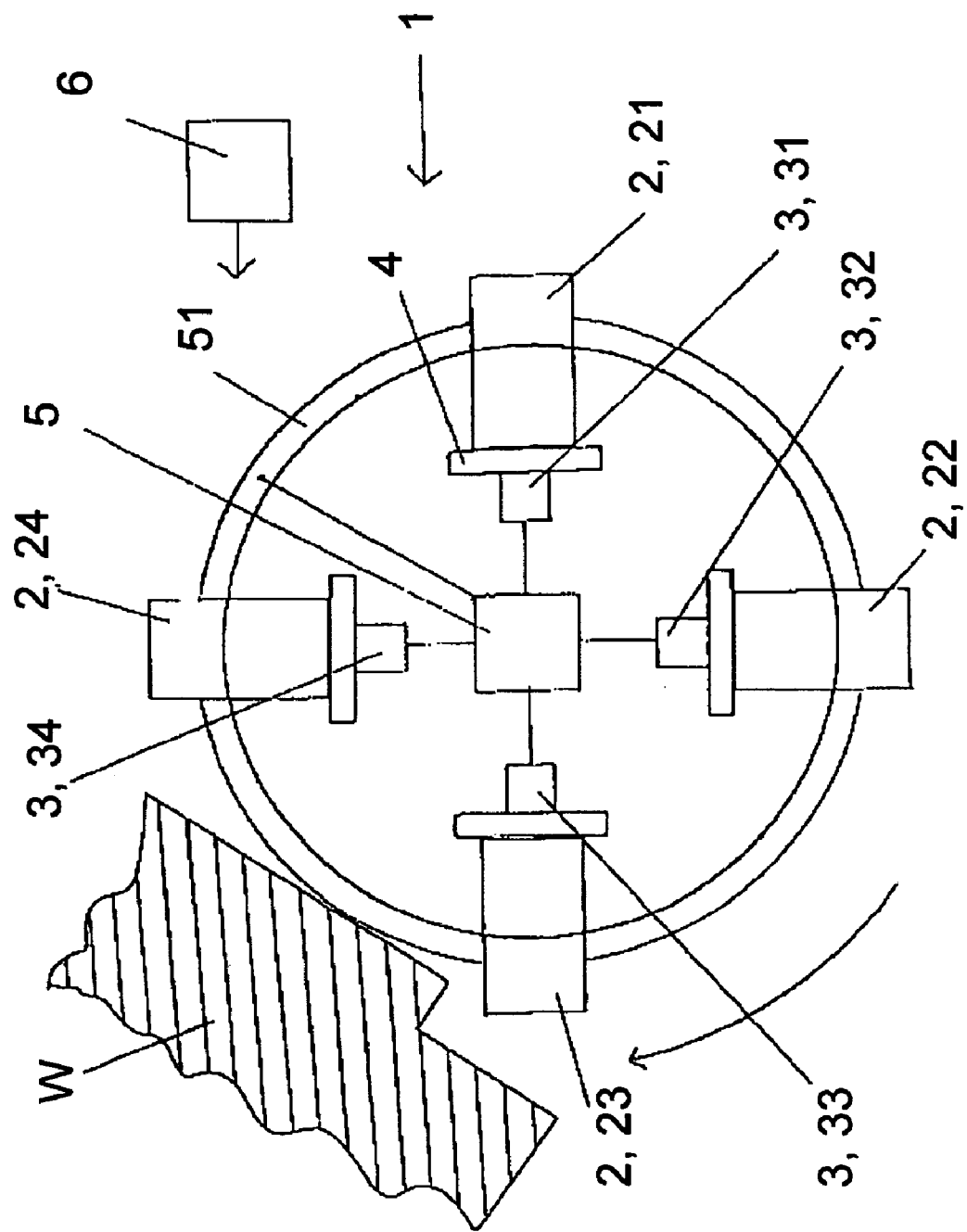

TOOL CONDITION MONITORING SYSTEM

CROSS-REFERENCE TO RELATED APPLICATIONS

This application claims priority to Swiss Application No. 1430/05 filed Aug. 31, 2005 and International Application Serial No. PCT/CH2006/000470 filed Aug. 30, 2006.

TECHNICAL FIELD

The present invention relates to a tool comprising a tool element, in particular a material cutting tool element according to the preamble of the independent claim 1. In particular, the invention relates to a blade front cutting head with single blade force measurement.

PRIOR ART

From the prior art, a plurality of material cutting tools is known, by means of which various materials are processed. For example, said tools are cutting tools, such as drills, cutters, planers or tools of all kinds, e.g. for the use in a turning lathe. In addition, tools for crashing or crushing certain materials, such as rock, metal, glass, plastics, composite materials or other materials inter alia are intended to be a tool in the sense of the present application. Said tools may be very large tools, such as drilling devices for drilling for petroleum or natural gas or for example a tunnel drilling tool, which are primarily used for processing of rock. On the other hand, it should be understood that the present invention also relates to smaller tools, e.g. cutter or cutting heads, for the use in a turning lathe or in another machine tool, e.g. for the use in a power drill, as already mentioned above.

In operating condition, all these tools are subject to one or more operating parameters which as such may influence the operating condition of the tool, so that these operating parameters have to be constantly monitored and may further be used in the control and/or regulation of the tool. That is, the tool may be regulated in operating condition taking into account the aforementioned operating parameters or operating dimensions, which e.g. may be a force, a mechanical pressure, a temperature but also the condition or wear condition of the tool or of one of its components. If for example the operating parameter temperature reaches a value which is too high or too low in a cutting head, then the operating parameters of the cutting head, for example the rotational speed of the cutting head or the feed parameters, may be adapted in such a way that a predetermined target temperature is reset when cutting a work piece. When cutting, drilling or crashing a material, another important operating parameter is for example the force or the force flow, and the mechanical pressure, respectively, acting upon the tool, in particular upon material cutting components of the tool in operation. On a drill head of a tunnel drilling machine or a drilling machine for drilling for natural resources, like petroleum or gas, or on drilling machines for geological investigations, on a tool formed as a drill head, usually several material cutting elements, like blades, elements for crashing or grinding and similar elements are typically provided, each of which may simultaneously be exposed to different values of the same operating parameter, which makes the correct control and/or regulation of the tool in operating condition very difficult. Thus, for example with a cutting tool, which has several blades, one blade may be very heavily loaded, for example with a high operating pressure, a high cutting force or a high temperature, while another blade of the same cutting tool is subject to the predetermined uncritical operating parameters. Up to now, such operation conditions of a tool are practically not recognizable or controllable, respectively, in a differentiated manner with tools known from the prior art, because in each case only an mean value of a respective operating parameter is measurable, which results from all individual operating parameters of the different tool elements of the tool, e.g. as a sum or mean value of the operating parameters of all blades attached to the same cutting head. The result is that the tools known from the prior art are not optimally controllable and/or adjustable, which may lead to poor working results, and can e.g. result in a lack of quality of a manufactured product, or in the worst case in the failure or the damage of the tool and machine elements attached thereto.

In the following, the problem described in general above will be investigated again in more detail with respect to an example of a blade front cutting head known from the prior art by way of illustration.

In the following, a multiple blade cutting tool known from the prior art is examined in more detail. For measuring of process forces and -moments acting on such a rotary cutting blade tool, cutting force dynamometers are used, such as known e.g. from CS-000000268555-BI or BG000000027981-A for a long time. With respect to the drilling and cutting process a four-component cutting force dynamometer is employed in a special well-known cutting tool. For example, RCD 9124B developed by Kistler company permits the detection of the spatial cutting force vector and the moment about the Z axis. The dynamometer consists of a four-component sensor, which is inserted between a base plate and a cover plate under a high preload. For charge amplification, for each component a two-range miniature charge amplifier is used. The output voltages thereof are digitized and telemetrically transferred to a stator. The power supply also occurs in a non-contacting manner. Cutting force dynamometers may be integrated into all usual machine spindles with SK or HSK adapters without large efforts. Despite various application options of RCDs in the context of process monitoring and analysis, the systems exhibit certain disadvantages due to their conceptual design. As a measuring result they only provide a total signal of all blades engaged. Thereby, the resolution decreases with increasing number of blades, since even a clear change of force at an individual blade is marginal in relation to the variation of the total signal. With RCDs, a single blade monitoring is only possible by removing all but one blade. In addition to the engagement conditions, the total signal also depends on geometrical relationships of the blades with respect to each other, which leads to very dynamic signal portions in complex processing features. The evaluation and interpretation of such signals are extremely demanding due to the large number and variations of signal forms. Upon simultaneous superposition of oscillations of the tool spindle system the separation of the force components from the total signal and the assignment to individual blades prove to be problematic. In individual cases, these difficulties even determine whether the signal can be evaluated at all. Furthermore, the constant component within the total signal is subject to a signal drift at a longer cutting duration. This means that despite a force is constantly applied, the drift causes a signal decrease and thus the measuring error constantly increases over time.

The data communication requires the external attachment of a stator, preferably but not necessarily, in the proximity of the rotor at the spindle. Since the stator has to be mounted at the spindle head side, a reconstruction is required, which possibly limits the accessibility. Due to its non-negligible weight of approximately 7.5 kg, in addition to the weight of the tool, such a dynamometer significantly influences the resilience behaviour of the tool spindle unit and considerably lowers the natural frequencies thereof to approximately 300 Hz. Upon stimulations in the proximity of the resonant frequency oscillation forms may occur, which do no longer allow any signal interpretation.

Furthermore the pulse-type stimulation only insignificantly differs by the blade engagement impact from the engagement-related signal forms whereby in particular the automated processing proves to be very difficult. In addition to the decrease of the natural frequency the high mass which is located upstream of the sensor causes an increase of the acceleration influence upon force measurement. Consequently, the measured signal no longer perfectly reflects the process at increased stimulation frequencies, but increasingly represents the oscillation behaviour of the mass located upstream.

As an alternative to the cutting force dynamometers illustrated above, for the measurement of processing forces force sensors may optionally be integrated into the spindle unit as it is also known from the prior art. For the application in engine spindles e.g. multi-component force measuring rings are used in the spindle adapter or spindle bearing, respectively. However, these applications have the important disadvantage that the mass located upstream of the sensor is clearly larger than with RCDs, and that the measurement takes place still farther remote from the cutting site. The mass-related deficiencies of the sensor application mentioned with respect to cutting force dynamometers arise to an increasing degree, and further disturbing factors influence the signal input, so that the measuring result illustrates the process of interest with a correspondingly increased uncertainty.

Another arrangement is described in U.S. Pat. No. 4,559,600. Since the blades in this document are located upstream of the sensor only one total signal therefore is measured. Further, the mass located upstream of the sensor is very high, so that the system exhibits low natural frequencies, whereby no high-speed processes can be examined.

The same difficulties apply to U.S. Pat. No. 6,257,953. The large inertia of the mass located upstream of the sensor leads to a low natural frequency.

OBJECTS AND BRIEF SUMMARY

Thus, the object of the present invention is to provide a tool in which the detection of an operating parameter, such as for example a force, a pressure or a temperature, which has an impact on a tool element, for example a blade of the tool, can be determined in a more reliable and more simple manner.

In operation, the tool should further permit a rotary movement and exhibit at least one geometrically defined blade.

This object is solved by the features of the independent claim 1.

Thus, the invention relates to a tool comprising a tool element which rotates in operation, in particular a material-cutting tool element having at least one geometrically defined blade, said tool element being subject to an operating parameter in the operating condition. Further, a measuring device is provided for determination and conversion of the operating parameter into a measuring signal. Consequently, a first measuring device cooperates with a first tool element in operating condition in such a manner that essentially only a first operating parameter of the first tool element may be detected by means of the first measuring device.

Thus, it is essential for the invention, that each individual tool element is associated with a measuring device for measuring the operating parameter, so that with the measuring device individually associated with a single assigned tool element essentially only the operating parameter of the associated tool element is detectable. For example, if there are provided several tool elements at one tool, as for example in a blade front cutting head with four single blades, the effect of a relevant operating parameter, e.g. a cutting force, may be determined separately and with the highest reliability for each of the four single blades. That is, apart from a certain "background noise" of the operating parameter, which results as a total or mean value of all partial operating parameters arising in the operating condition, for example as a sum of all affecting forces, pressures etc. at a certain measuring device of a certain tool element or at the tool as such, the operating parameter may be determined and resolved completely specifically for each individual tool element of the tool in a tool according to the invention. Usually, the occurring "background noise" referred to above as a total signal or mean value of a signal is either small with respect to the actual measuring signal of the operating parameter of a specific tool element, or so specific for the corresponding tool element, or tool, respectively, that it may be reliably separated from the actual signal of interest of the operating parameter of the individual tool element with well-known evaluation procedures.

The tool element of the tool preferably is a cutting tool element, in particular a cutting plate and/or a cutting element and/or a drilling head for cutting a work piece and/or a material.

In this respect, the tool in one embodiment particularly relevant for practice comprises at least two, in particular four or six separate tool elements, and for each of the separate tool elements there is provided a distinct associated measuring device.

Thus, the measuring device preferably is a pressure sensor and/or a force sensor, in particular a piezoelectric and/or piezoresistive pressure sensor and/or a force sensor, in particular a Slim Line sensor, and/or the measuring device is a temperature sensor, in particular a piezoresistive temperature sensor, and/or a resistance temperature sensor and/or a thermocouple.

In particular, the measuring device may also be a measuring device for monitoring the condition of the tool, in particular for monitoring the condition of the tool element, so that the wear condition of the tool and/or the tool element may be monitored, for example. Depending on the kind of the tool, tool element or respective application, for example depending on the material to be processed, this may be for example a measuring device for the measurement of an electrical resistance, an optical or acoustic parameter, e.g. a resonance characteristic of the tool element and/or the tool, or a measuring device for the determination of another characteristic parameter, which is appropriate to determine and/or to monitor, the condition or wear condition, respectively, of the tool element or the tool, respectively.

For optimizing the transmission of the operating parameter between the tool element and the measuring device in particular a coupling element may be provided.

Depending on the application or tool, the relevant operating parameter may be a force and/or a pressure and/or a force flow, which may be transferred from the tool element, in particular a cutting plate, via the coupling element formed as an intermediate disk to the measuring device in such a manner that the operating parameter may be received by a basic body of the tool.

For the transmission of the measuring signal to an analytical unit a signal transmission means, in particular a signal transmission means with a signal amplifier may be provided at the tool, whereby the signal transmission means is an optical, an acoustic, mechanical or an electromagnetic signal transmission means, preferably a multi-channel telemetry, in particular a four-channel telemetry, i.e. it is a multi- or four-channel radio communication means, and in particular for the transmission of the measuring signal an antenna ring is provided. It should be understood however, that the signal transmission may also occur in another way, e.g. in acoustic, in particular ultrasonic, optical ways or also mechanically, e.g. by means of a collector ring arrangement.

In this case, the tool particularly is a cutting tool, especially a drill and/or a cutting tool, in particular a blade front cutting head with piezoelectric and/or piezoresistive single blade force measurement, or a hammer and/or a drill and/or a blade for cutting or crushing rock and/or metal and/or wood and/or another material.

In particular, a machine tool is claimed, comprising a tool according to the present invention, wherein the machine tool exhibits one or more controlled or regulated axes.

One embodiment of a tool according to the invention which is particularly important for the practice is a blade front cutting head with single blade force measurement. For example, such a cutting head may comprise four or six blades, wherein at each blade a so-called Slim Line sensor is mounted. Slim Line sensors are particularly compact, disk-shaped sensors, the function of which relies on the piezoelectric and/or piezoresistive effect. For amplifying the charge shift produced in a piezoelectric manner, four or six signal measurement amplifiers, in particular four or six independent charge measuring amplifiers may be integrated into the blade head. The transmission of the signals, in particular force signals, from the rotary tool is done by multi-channel telemetry with a predetermined transmission rate, for example with a transmission rate of X per channel, so that the process dynamics for example may be resolved up to a certain frequency, i.e. up to about Y Hz, wherein X and Y are numbers, which indicate data transmission rate and/or the resolution for the signal transmission in the particular case.

The single blade force measurement at the blade head with the blade front cutting head according to the present invention described above, exhibits numerous advantages with respect to the disadvantages of RCDs specified in the beginning. In particular, the sensors may clearly shed light on all components of the cutting force, i.e. on the horizontal force portions and/or the normal force portions of the cutting force at the individual tool blade. Each blade is clearly assigned to an individual force signal, so that the information is not provided in form of a complex total signal. Thus, the non-negligible effort for the identification of individual signal portions from the total signal can be avoided, or the reliable evaluation of individual specific signal portions of a tool element may be reliably realized for the first time at all, particularly since the poor signal resolution of the tools known from the prior art includes a high risk of misinterpretation in particular for inexperienced users. The reduction of the number of possible signal forms is a substantial factor, which enables the fundamental evaluability of complex signals for the first time in a reliable manner, in particular in the case, when inevitable signal dynamics of the tool spindle system occur in addition to the static force signals.

BRIEF DESCRIPTION OF THE DRAWING

In the following the invention is described in more detail with respect to the FIGURE. There is shown in schematic illustration:

FIG. 1 is a schematic illustration of a tool according to the invention.

DETAILED DESCRIPTION OF THE EMBODIMENTS

FIG. 1 shows a tool according to the invention in a schematic illustration in form of a blade front cutting head with single blade force measurement, which tool in the following is indicated entirely by the reference numeral 1.

The blade front cutting head 1 rotating in operation is schematically illustrated in FIG. 1 in operating condition, wherein the blade front cutting head 1 processes a surface of a work piece W, by cutting material of a given thickness at the surface of work piece W. In the particular embodiment of FIG. 1 four tool elements 2, 21, 22, 23, 24 are provided at the blade front cutting head 1 in the form of four geometrically defined cutting plates 2, 21, 22, 23, 24, which process the work piece W at its surface in a cutting manner. Each of the four cutting plates 2, 21, 22, 23, 24 is coupled via a coupling element 4 formed as an intermediate disk 4 to an assigned measuring device 3, 31, 32, 33, 34 each, by which measuring device 3, 31, 32, 33, 34 an operating parameter of a cutting plate 2, 21, 22, 23, 24 may be detected separately in each case. That means that behind each cutting plate 2, 21, 22, 23, 24 there is a measuring device 3, 31, 32, 33, 34, in particular one Slim Line sensor 3, 31, 32, 33, 34 in each case. Since the blade load in the process would lead to an increased edge load at the sensor 3, 31, 32, 33, 34, the intermediate disk 4 serves for bidimensional distribution of force on the sensor element.

In the present example of FIG. 1 the operating parameter e.g. is a cutting force and the measuring device 3, 31, 32, 33, 34 is a piezoelectric and/or piezoresistive sensor, by means of which the cutting force, which is applied to one of the cutting plates 2, 21, 22, 23, 24, is selectively measurable for each of the cutting plates 2, 21, 22, 23, 24 in an individual manner. The measuring devices 3, 31, 32, 33, 34 are signal-connected with a signal transmission means 5, comprising a signal amplifier not explicitly represented in the present example. In a particular embodiment variant charge shifts which have been caused in a piezoelectric manner in the measuring device 3, 31, 32, 33, 34 are converted and amplified e.g. to a voltage signal by charge measuring amplifiers. The signal transmission means 5 is further signal-connected with an antenna ring 51, by means of which the measuring signals of the measuring devices 3, 31, 32, 33, 34 may be transmitted to an analytical unit 6 in the form of electromagnetic signals. In the example represented in FIG. 1 the measured signals are transferred from rotary tool 1 via antenna ring 51 to a static, non-rotating part of the signal processing by means of a four-channel telemetry. Again, the analytical unit 6 itself is signal-connected with a control and/or regulation for the tool not represented in FIG. 1, so that the operating parameter separately determined with the measuring devices 3, 31, 32, 33, 34 for each of the cutting plates 2, 21, 22, 23, 24 may be used for monitoring and/or control and/or regulation of tool 1 in the operating condition.

Both the charge measuring amplifiers, which are integrated into and/or signal-connected with the signal transmission means 5, and the rotary part of the telemetry are to be supplied with energy. For this purpose, e.g. a battery may be provided in the rotary part of tool 1, which in operation supplies sufficient capacity for a certain period of time, e.g. for about half an hour of service life. Of course, the power supply of the rotary part of tool 1 may also be effected in another way, e.g.

by means of a sliding contact by an external energy source in the non-rotating part of tool 1 or an associated machine tool, or in another suitable way.

It should be understood that the invention is not limited to the embodiments exemplarily represented above. In contrast, the nature of the invention is most generally to be seen in the fact that the impact of a certain relevant operating parameter for each tool element may be detected separately and may be evaluated for further use. In particular, but not limited to, the invention also relates to all suitable combinations of the embodiments described in this application.

In summary, the special advantages of the present invention may be described exemplarily with respect to the embodiment particularly important for the practice of a blade front cutting head with single blade force measurement, in particular for measuring the radial, and/or axial and/or horizontal and/or normal component of the cutting force in operating condition of the blade front cutting head. At each of the individual blades of a four-blade blade front cutting head, Slim Line sensors are integrated into a tool base. Slim Line sensors are disk-shaped, compact sensors of high rigidity based on the piezoelectric effect, so that the arising forces are measured practically pathless. The sensor is located in force flow direction following an intermediate disk, which distributes the process-related edge load arising in a bidimensional manner. The sensors are directly mounted on the tool base. For the amplification of the piezoelectric charge shift, preferably four independent 2-range miniature charge measuring amplifiers are integrated into the blade front cutting head. The transmission of the four force signals is done telemetrically via four channels by means of frequency modulation. The telemetry possesses a transmission rate of X kHz per channel, so that the maximum resolution of the signals is limited to X/2 kHz. To this end, an antenna ring provides for favourable signal transmission conditions. For example the power supply of the charge measuring amplifiers and the rotary part of the telemetry is performed over a battery arranged in the centre.

LIST OF REFERENCE NUMERALS

1 tool
2 tool elements
21 first tool element
22 tool element
23 tool element
24 tool element
3 measuring devices
31 first measuring device
32 measuring device
33 measuring device
34 measuring device
4 coupling element
5 signal transmission device
51 antenna ring
6 analytical unit
W work piece

The invention claimed is:

1. A tool comprising:
a first material cutting tool element which rotates in operation with at least one geometrically defined blade, said tool element generating a first operating parameter relating directly to the rotation of the tool element in the operating condition,
a first measuring device being provided for determination and conversion of the first operating parameter generated by the first tool element into a measured signal,
at least a second tool element separate from the first tool element,
a second measuring device associated only with the second tool element and cooperating with the second tool element in operating condition in such a manner that essentially only an operating parameter generated by the second tool element may be detected by means of the second measuring device, and
wherein the first measuring device cooperates with the first tool element in operating condition in such a manner that essentially only the first operating parameter generated by the first tool element may be detected by means of the first measuring device.

2. The tool according to claim 1, wherein the first tool element is a cutting tool element for cutting a work piece selected from the following a cutting plate, a cutting element and a drilling head.

3. A machine tool, comprising a tool according to according to claim 2, wherein the machine tool has one or more controlled or regulated axes.

4. A tool according to claim 1, wherein the first measuring device is one of the following: a pressure sensor, a force sensor, a piezoelectric pressure sensor, a piezoelectric force sensor, piezoresistive pressure sensor, a piezoresistive force sensor, a Slim Line sensor, a temperature sensor, a piezoresistive temperature sensor, a resistance temperature sensor and a thermocouple.

5. A machine tool, comprising a tool according to according to claim 4, wherein the machine tool has one or more controlled or regulated axes.

6. A tool according to claim 1 wherein the first measuring device is a measuring device for monitoring the condition of the first tool element.

7. A machine tool, comprising a tool according to according to claim 6, wherein the machine tool has one or more controlled or regulated axes.

8. A tool according to claim 1, wherein between the first tool element and the first measuring device a coupling element is provided for the transmission of the operating parameter.

9. A tool according to claim 8 wherein the first tool has a basic body, the coupling element is formed as an intermediate disk, and the operating parameter is one of a force, a pressure and a force flow, which may be transferred from the first tool element via the coupling element to the first measuring device in such a manner that the operating parameter may be received by the basic body of the tool.

10. A machine tool, comprising a tool according to according to claim 9, wherein the machine tool has one or more controlled or regulated axes.

11. A machine tool, comprising a tool according to according to claim 8, wherein the machine tool has one or more controlled or regulated axes.

12. A tool according to claim 1, wherein a signal transmission means with a signal amplifier may be provided at the tool for the transmission of the measuring signal from the first measuring device to an analytical unit.

13. A tool according to claim 12, further comprising for transmitting the measured signal from the first measuring device, an antenna ring and one of: an optical signal transmitter, an acoustic signal transmitter, a mechanical signal transmitter and a multi-channel telemetry signal transmitter.

14. A machine tool, comprising a tool according to according to claim 13, wherein the machine tool has one or more controlled or regulated axes.

15. A machine tool, comprising a tool according to according to claim 12, wherein the machine tool has one or more controlled or regulated axes.

16. A tool according to claim 1, wherein the tool is a one of the following: a drill, a cutting tool, a blade front cutting head with piezoelectric single blade force measurement, a blade front cutting head with piezoresistive single blade force measurement, a hammer and a blade.

17. A machine tool, comprising a tool according to according to claim 16, wherein the machine tool has one or more controlled or regulated axes.

18. A machine tool, comprising a tool according to claim 1 wherein the machine tool has at least one controlled or regulated axes.

19. A machine tool, comprising a tool according to according to claim 1, wherein the machine tool has at least two controlled or regulated axes.

* * * * *